United States Patent [19]
Hamasaki

[11] 3,778,083
[45] Dec. 11, 1973

[54] RIDER'S BODY PROTECTING DEVICE FOR A HIGH SPEED VEHICLE OPERABLE IN A COLLISION THEREOF

[75] Inventor: Masafumi Hamasaki, Nobeoki, Japan

[73] Assignee: Asahi Kasei Kogyo Kabushiki Kaisha, Osaki, Japan

[22] Filed: May 17, 1971

[21] Appl. No.: 143,921

[30] Foreign Application Priority Data
May 25, 1970 Japan.................. 45/44011
June 25, 1970 Japan.................. 45/62639

[52] U.S. Cl.............. 280/150 AB, 98/2 R, 138/41, 138/40
[51] Int. Cl............................................. B60r 21/08
[58] Field of Search ............... 280/150 AB; 181/46; 138/41, 40; 98/2; 137/67, 68

[56] References Cited
UNITED STATES PATENTS

| | | | |
|---|---|---|---|
| 1,254,100 | 1/1918 | Willis | 138/41 X |
| 1,811,762 | 6/1931 | Schnell | 181/46 X |
| 3,197,234 | 7/1965 | Bertrand | 280/150 AB |
| 3,209,857 | 10/1965 | Eckel | 181/56 X |
| 3,327,628 | 6/1967 | Loprest et al | 181/67 |
| 3,614,129 | 10/1971 | Sobknow | 280/150 AB |
| 3,642,303 | 2/1972 | Irish et al | 280/150 AB |
| 3,172,684 | 3/1965 | Isaac | 280/150 AB |
| 2,927,462 | 3/1960 | Li | 138/40 X |
| 2,929,248 | 3/1960 | Sprenkle | 138/40 X |
| 3,467,120 | 9/1969 | Hill et al | 137/68 |
| 2,649,311 | 8/1953 | Hetrick | 280/150 AB |
| 3,370,886 | 2/1968 | Frost | 280/150 AB |

*Primary Examiner*—Kenneth H. Betts
*Assistant Examiner*—John P. Silverstrim
*Attorney*—Oldham & Oldham

[57] ABSTRACT

In a rider's body protecting device for a high speed vehicle of the type including gas producing means and an inflatable bag adapted to be filled and inflated with gases from the gas producing means to support the rider's body, gas exhaust pipe means are provided which are so sized in pipe diameter as not to have any adverse effect on the inflation of the bag and allow a part of the gases fed in the bag to be released to the exterior of the vehicle. This advantageously serves to suppress any excessive rise of the gas pressure in the bag which may otherwise occur at the instant when the rider's body moving forward by inertia hits on the bag. Also, an auxiliary shock absorbing bag is employed in combination with the main bag in order to improve the stability of inflation of the bag means and the cushioning effect of the whole device.

5 Claims, 13 Drawing Figures

PATENTED DEC 11 1973
3,778,083
SHEET 1 OF 3
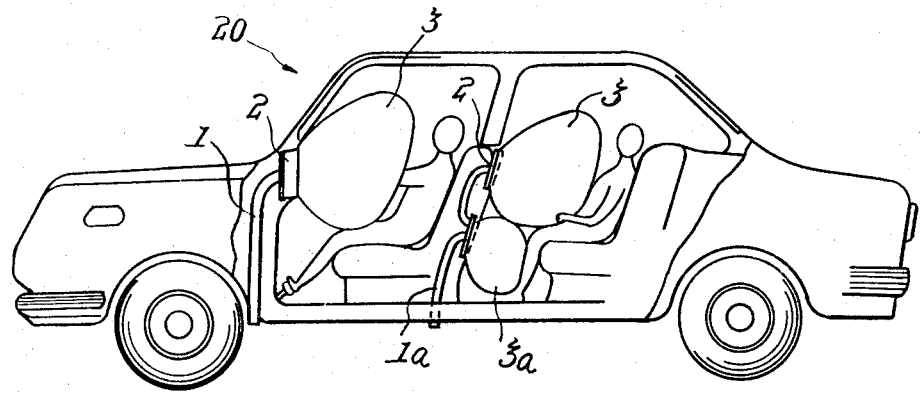
Fig. 1.
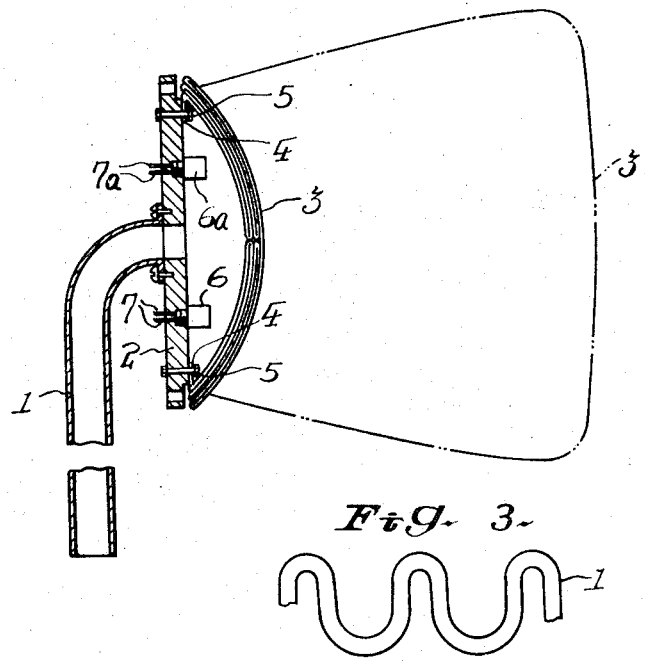
Fig. 2.
Fig. 3.
INVENTOR
BY
ATTORNEY

RIDER'S BODY PROTECTING DEVICE FOR A HIGH SPEED VEHICLE OPERABLE IN A COLLISION THEREOF

FIELD OF THE INVENTION

This invention is concerned with safety devices for a high speed vehicle such as an automobile which are designed to operate in a collision accident of the vehicle to protect the body of the rider thereon.

BACKGROUND OF THE INVENTION

In recent years, shock absorbing devices of the general type including an inflatable bag and associated gas producing means operable at the instant of collision to produce gases effective to inflate the bag have been developed to serve the purpose of protecting the rider's body in a possible colliding accident of high speed vehicles such as an automobile. As is well known, the bag is so arranged that when inflated it serves to support the rider's body with a cushioning effect enough to protect the rider's body from injury to which the rider may otherwise be subjected.

In this operation, the bag is inflated under a relatively low pressure but, at the instant when the rider's body moving forward by inertia comes to hit against the bag inflated, the gas pressure therein is raised suddenly to enhance the repelling action of the bag to such an extent that the rider's body may be injured under the increased repelling force of the bag. In view of this, it is desirable that the safety device for high speed vehicles be so constructed that the rise in gas pressure in the bag occurring when the rider's body comes to hit against the bag is effectively reduced. The measure previously taken to meet this requirement has been to provide the bag with gas releasing means, for example, in the form of a sheet type relief valve or to make a local portion of the bag weaker in structure than the remaining portion thereof. Such gas releasing means on the bag, operating at the instant when the gas pressure in the bag is raised by the hitting of the rider's body against the bag, allows the gases to escape out of the bag thereby preventing any further rise of the gas pressure therein.

However, with previous shock absorbing safety devices having such gas releasing means provided on the bag per se, the gases therein are apparently released into the interior space of the the vehicle upon operation of the gas releasing means and this may cause some undesirable influence upon the rider's body particularly when the vehicle room is substantially enclosed.

In the usual case where the gas producing means of the safety device employs as its gas source a gas forming composition such as an explosive powder or combustible compound or a liquefied Freon gas, the use of a gas releasing means of the previous type means that poisonons gases such as carbon monoxide, nitrogen oxide, hydrochloride gas or Freon gas are released in the interior of the vehicle. Also, if the gases within the bag are released into the car room which is in a substantially enclosed state, the room pressure is instantaneously raised to such an extent that the rider may be subjected to ancillary damages, for example, rupturing of the tympanum.

OBJECT OF THE INVENTION

The present invention is designed to overcome the above described difficulties met with previously known body protecting devices and has for its object the provision of a noval rider's body protecting device for a high speed vehicle so arranged that the gases fed in the inflatable bag at the instant of collision are released to the exterior of the vehicle under the hit of the rider's body against the bag thereby to effectively alleviate the impact acting upon the rider's body.

According to the present invention, there is provided a rider's body protecting device of the type including gas producing means and an inflatable bag which is characterized by the arrangement of a gas exhaust pipe having such a diameter as not to affect the inflation of the bag to any suitable extent, which pipe is connected at one end with the bag through the medium of a support therefor and terminates at the other end outside of the vehicle thereby to serve the purpose of preventing any substantial rise of the gas pressure in the bag at the instant when in a collision the rider's body moving forward by inertia hits against the bag by allowing the gases therein to be released to the exterior of the vehicle.

Another object of the present invention is to provide a rider's body protecting device of the character described in which the gas exhaust pipe is provided in an appropriate portion thereof with a flow resisting body effective to control the rate at which the gases are released therethrough thereby to make the bag stable when it is inflated at the instant of collision.

A further object of the present invention is to improve the shock absorbing or cushioning effect of a rider's body protecting device of the character described by providing an auxiliary shock absorbing bag in association with the gas exhaust pipe to serve the purpose of supporting the lower part of the rider's body in a collision.

These and other objects, features and advantages of the present invention will become apparent from the following description when taken in conjunction with the accompanying drawings, which illustrate a few preferred embodiments of the invention.

BRIEF DESCRIPTION OF THE DRAWINGS

FIG. 1 is a partly cutaway side elevational view of an automobile showing the manner in which a number of driver's body protecting devices embodying the invention are equipped in the automobile;

FIG. 2 is a cross-sectional side view of an inflatable bag structure having a gas exhaust pipe arranged in connection therewith according to the invention, showing the inflated state of the bag by chain lines;

FIG. 3 is a side view showing a modification of the gas exhaust pipe of FIG. 2.;

DESCRIPTION OF THE PREFERRED EMBODIMENTS

Figure 4:
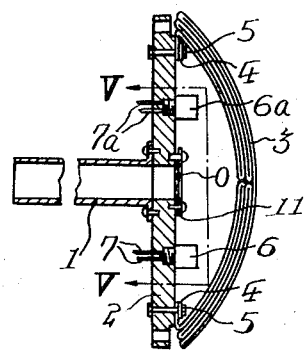
FIG. 4 is a view similar to FIG. 2 showing another embodiment of the invention including a gas exhaust pipe provided with a wire netting for controlling the rate at which gases are exhausted through the pipe.

Referring first to FIG. 1, which illustrates an automobile 20 equipped with rider's body protecting devices of the invention, shock absorbing bags 3 of the respective devices are mounted on respective support plates 2 and are shown in their inflated state assumed in operation. Gas exhaust pipes 1 are arranged to communicate at one end with the interior of the respective bags 3 through the medium of the support plates 2 and one of the pipes 1 communicating with the bag 3 for the front rider is extended to terminate at the other end outside of the automobile. The body protecting device for the rear rider includes an auxiliary shock absorbing bag 3a which serves to protect the lower part of the body of the rear rider and is arranged in communication with the other end of the gas exhaust pipe 1 and also with a gas exhaust pipe 1a which terminates outside of the automobile, in effect forming an extension of the pipe 1.

Referring next to FIG. 2, the support plate 2, through which the gas exhaust pipe 1 is secured to the bag 3, serves to support the entire body protecting device, the inflatable bag 3 being fixed to the support plate 2 by bolt means through the intermediary of a support frame 4. As a material for the bag, Nylon is usually employed but it can also be made of such synthetic fiber material as Saran, polyester or polyacrylonitrile or of natural fiber or regenerated fiber material. Also, any such bag material can be used with an appropriate heat-resistant, heat-insulating or sound-absorbing material applied thereon, as required.

Reference numerals 6 and 6a indicate respective gas producing means arranged on the support plate 2 inside of the bag 3 and each including as a gas forming composition a liquefied form of gas such as of Freon or carbonic acid gas, a highly compressed form of gas such as of air or nitrogen, an explosive powder or a combustible compound. If desired, such gas producing means 6, 6a may be arranged in a location other than on the support plate 2 as long as appropriate communicating pipe means are provided to conduct the gases produced into the bag 3. Reference numerals 7 and 7a indicate lead wires provided for electrically actuating the gas producing means 6 and 6a.

The gas exhaust pipe 1 should have a strength enough to withstand any external force to which it may be subjected in a collision of the high speed vehicle and can be made of metal, plastic, asbestos, glass or the like material. Also, the exhaust pipe 1 may be formed straight or curved as shown in FIG. 2, or be formed as a meandering pipe as shown in FIG. 3, as required. The inner diameter of the gas exhaust pipe 1 is so determined that upon operation of the gas producing means 6 and 6a the bag 3 can be effectively inflated with the gases produced despite of the provision of gas exhaust pipe 1. The outer or downstream end of the exhaust pipe 1 is extended to the outside of the vehicle as seen in FIG. 1. If desired, appropriate silencer or muffler means may be arranged in the gas exhaust pipe 1.

If a high speed vehicle such as an automobile equipped with such rider's body protecting device or devices comes into collision, the rider is naturally moved forward by inertia to hit against the bag 3, which is inflated with gases produced by the gas producing means 6 and 6a, previously actuated at the instant of collision of the vehicle, but owing to the provision of gas exhaust pipe 1 allowing the gases to escape therethrough any excessive rise of the gas pressure in the bag 3 and hence any extraordinary repelling action of the bag are effectively avoided and the shock or impact acting against the rider's body through the resilience of the gases is greatly alleviated. Moreover, since the gases produced in the bag 3 is exhausted through the gas exhaust pipe 1 exteriorly of the high speed vehicle, there is no danger that any poisonons gas be released into the interior of the vehicle or that the air pressure in the room be raised and thus the rider is perfectly free from any undesirable effect of the gases released out of the bag unlike the case of any conventional safety device having gas releasing means arranged directly on the shodk absorbing bag to allow the gases to escape therefrom.

Further with the device of the invention, since the gases produced or fed in the bag is releasable through the gas exhaust pipe of an appropriate inner diameter at the instant when the bag is inflated with such gases, any sudden rise of the gas pressure in the bag as would otherwise occur when the rider's body hits against the inflated bag to reduce its volume is effectively avoided. This means that the device of the invention has a highly improved shock absorbing effect compared with the previous type of safety device provided with gas releasing means such as a relief valve operable when the pressure in the bag has reached a predetermined valve to allow the gases to escape out of the bag.

Moreover, with the device of the invention, the release of the gases during the time when the bag 3 is being inflated can be restrained or controlled as desired by arranging an appropriate flow control element, such as a perforated plate, a sheet type relief valve or a pipe constriction, at a suitable axial location of the gas exhaust pipe.

Figure 5:
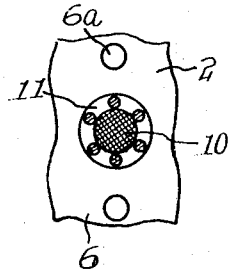
FIG. 5 is a cross-sectional view taken along the line V—V in FIG. 4.

For example, in FIGS. 4 and 5, a wire netting 10 is fixed by screw means to the straight gas exhaust pipe 1 at its end adjacent to the inflatable bag through the medium of support frame 11. With this arrangement, it will readily be understood that the rate of flow of the gases being released through the gas exhaust pipe 1 when the bag 3 is inflated is effectively controlled by the resistance of the wire netting 10 to the gas flow. The arrangement of wire netting 10 is also effective to restrain the release of the flames formed in cases where the gas producing means 6 and 6a include some or other gas forming composition as a gas source.

Figure 6:
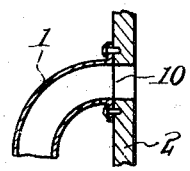
FIG. 6 is a cross-sectional view showing a modified form of flow control element which takes the form of a thin metal sheet.

FIG. 6 illustrates another example of the flow control means which is in the form of a sheet type relief valve 10 fixed by screw means to the end of the gas exhaust pipe 1 adjacent to the bag. In this case, the valve sheet 10 usually takes the form of an aluminum foil which is to be ruptured upon inflation of the bag to release the gases therefrom through the gas exhaust pipe 1 at a controlled rate.

Figure 7:
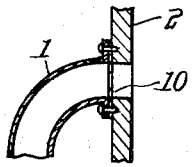
FIG. 7 illustrates a further modification of the flow control element which takes the form of an orifice diaphragm.

In FIG. 7 there is shown a further example of the flow control means including an orifice plate 10 of an appropriate orifice diameter, which is arranged in the bag side end of gas exhaust pipe 1 to form a constricted gas passage therein. Apparently, this orifice serves effectively to control the rate of flow of the gases being released through the gas exhaust pipe 1 while the bag 3 is being inflated.

Figure 8:
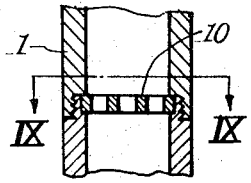
FIG. 8 illustrates yet another modification of the flow control element which takes the form of a perforated plate arranged in the gas exhaust pipe.
Figure 9:
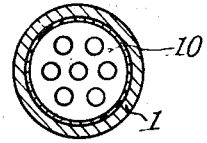
FIG. 9 is a cross-sectional view taken along the line IX—IX in FIG. 8.

FIGS. 8 and 9 illustrate another example which employs a perforated plate 10 arranged in a straight portion of the gas exhaust pipe 1 to serve, when the bag 3 is inflated, to present a desired flow resistance to the gases escaping from the bag through the gas exhaust pipe 1. It will readily be understood that the perforated plate 10 is also effective to intercept the flames formed while providing a muffling effect in cases where a gas forming composition is employed as a gas source for gas producing means 6 and 6a.

Figure 10:
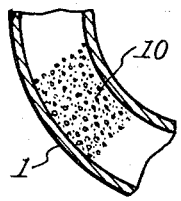
FIG. 10 is a cross-sectional view showing a mass of metal rag loaded in an intermediate portion of the gas exhaust pipe as a flow controlling element.

FIG. 10 illustrates the arrangement of a mass of metal rag in bent portion of gas exhaust pipe 1. It will be apparent that the gases being released through the gas exhaust pipe 1 are resisted by the metal rag to flow at a controlled rate. The metal rag also exhibits a flame intercepting effect in cases where a gas forming composition is employed as a gas source for the gas producing means.

Figure 11:
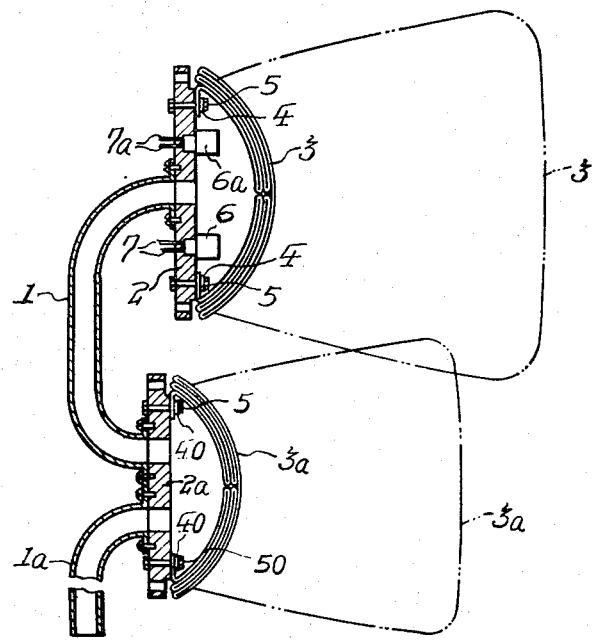
FIGS. 11 and 12 are cross-sectional views illustrating respective further embodiments of the invention which are each provided with an auxiliary shock absorbing bag in connection with the gas exhaust piping.
Figure 12:
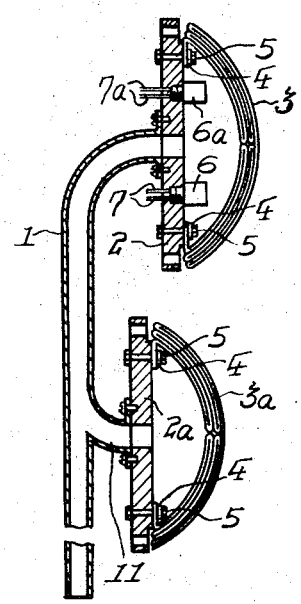
Figure 13:
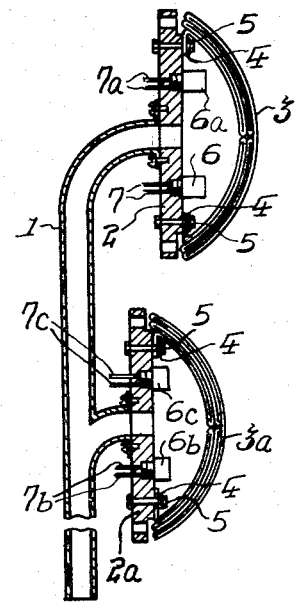
FIG. 13 is a view similar to FIGS. 11 and 12 showing a further embodiment of the invention which includes a main and an auxiliary shock absorbing bag and a gas exhaust pipe arranged in common for the two bags.

Shown in FIGS. 11 to 13 are respective further embodiments of the present invention which have been developed effectively to protect the entire body of the rider and are each operable not only to support the main or upper part of the rider's body but also to prevent forward movement of the lower part of the rider's body as supported at his head or chest, which has been unfeasible with any conventional type of protecting device for high speed vehicles.

Specifically, in these embodiments of the invention, an auxiliary shock absorbing bag is provided in association of the gas exhaust pipe means featuring the present invention and is operable in a collision of the high speed vehicle to support the lower part of the rider's body including his knees and lower leg portions with a cushioning effect sufficient to protect the rider's body and particularly its lower part.

In the embodiment shown in FIG. 11, the gas exhaust pipe 1 employed in substantially the same manner as in the embodiment of FIG. 2 is connected at the other or downstream end with a support 2a, on which an auxiliary shock absorbing bag 3a is mounted, to serve the purpose of directing the gases released from the main bag 3 into the auxiliary bag 3a, and there is fixed to the support 2a a gas exhaust pipe 1a which serves for the auxiliary bag 3a in the same manner as the gas exhaust pipe 1 serving for the bag 3 and which is extended to terminate outside of the vehicle. The auxiliary bag 3a may be made of the same material as that used for the bag 3 and as shown is fixed to the support 2a by mounting bolts 5 through the medium of a support frame 40.

In a collision of the high speed vehicle equipped with the protecting device, the auxiliary shock absorbing bag 3a serves to support the lower part of the rider's body moving forward by inertia and thus the rider's knees and lower leg portions can be fully protected even though they may not be cushioned by the main bag 3 in any effective manner. To serve this purpose, the auxiliary bag 3a is arranged on the vehicle in an appropriate position in front of the lower part of the rider's body and is so formed as to be effectively inflated with the gases being released from the main bag 3. As will readily be understood, the rate at which the gases from the main bag 3 is fed into the auxiliary bag 3a and that at which the gases fed in the latter is exhausted therefrom can be controlled in a desired manner by the use of flow control means such as shown and described in connection with the previous embodiments, including the wire netting shown in FIGS. 4 and 5, the thin metal sheet in FIG. 6, the orifice plate in FIG. 7 or the perforated plate in FIGS. 8 and 9. Also, any suitable muffling means may be provided in association with the gas exhaust pipes 1 and 1a, as required.

Referring to FIG. 11, when the rider's body is moved forward by inertia in a collision of the high speed vehicle to hit against the bag 3, which has previously been inflated by the gases produced or fed in the bag by the gas producing means 6 and 6a, the bag serves to support the upper part of the rider's body, the impact to which the latter is subjected being alleviated by the resilience of the gases filled in the bag, and at this instant the auxiliary cushioning bag 3a connected as a further safety means with the bag 3 through the medium of gas exhaust pipe 1 is inflated with the gases released from the bag 3 as indicated by the chain lines in FIG. 11 to support the lower part of the rider's body including the knees and lower leg portions, which cannot be cushioned by the main bag in any effective manner, thereby to protect that body part from injury with the cushioning effect due to the resilience of the gases. Obviously, the gases are immediately exhausted to the exterior of the automobile or other high speed vehicle through the exhaust pipe 1a and this provides to the rider a safety much improved over the conventional type of body protecting device.

In FIG. 12, which illustrates a modification of the embodiment of FIG. 11, the gas exhaust pipe 1 secured to the support 2 for the main bag 3 is branched as at 11 in order to direct the gases from the bag 3 into the auxiliary shock absorbing bag 3a and at the outer end terminates outside of the vehicle, eliminating the need of providing for the auxiliary bag 3a any separate gas exhaust pipe such as indicated at 1a in FIG. 11.

FIG. 13 illustrates a further modification, which has a gas exhaust pipe 1 arranged in common to the main and auxiliary shock absorbing bags 3 and 3a as with the case of the embodiment of FIG. 12, but differs therefrom in that the auxiliary bag 3a has arranged therein gas producing means 6b and 6c substantially similar to those arranged in main bag 3 and can be inflated with gases produced by the gas producing means 6b and 6c independently from the gases released from the main bag 3 and with a correspondingly increased accuracy. In the respective devices of FIGS. 12 and 13, the protecting effect of the auxiliary shock absorbing bag 3a for the lower part of the rider's body is apparently the same as with the case of the embodiment of FIG. 11.

While the invention has been shown in several forms, it is obvious to those skilled in the art that it is not so limited but is susceptible of various changes and modifications without departing from the spirit of the invention or from the scope of the appended claims.

What is claimed is:

1. A rider's body protecting device for a high speed vehicle operable in a collision thereof, comprising an inflatable bag operable to support the rider's body, gas producing means for feeding gases into said bag, and a gas exhaust pipe so sized in inner diameter as not to affect the inflation of said bag, said gas exhaust pipe being in communication at one end with the interior of said bag and terminating at the other end exteriorly of the vehicle to allow the gases within said bag to be released to the exterior of the vehicle, and an auxiliary bag which is substantially similar in structure to said inflatable bag and operable to support the lower part of the rider's body, said auxiliary bag being provided with a gas exhaust pipe for releasing the gases therefrom in common with the one provided for said main or inflatable bag.

2. A rider's body protecting device for a high speed vehicle operable in a collision thereof, comprising an inflatable bag operable to support the rider's body, gas producing means for feeding gases into said bag, and a gas exhaust pipe so sized in inner diameter as not to affect the inflation of said bag, said gas exhaust pipe being in communication at one end with the interior of said bag and terminating at the other end exteriorly of the vehicle to allow the gases within said bag to be released to the exterior of the vehicle, and an auxiliary inflatable bag which is substantially similar in structure to said inflatable bag and operable to support the lower part of the rider's body, gas producing means in said auxiliary bag, said auxiliary bag being provided with a gas exhaust pipe for releasing the gas therefrom in common with the one provided for said first inflatable bag.

3. A rider's body protecting device for a high speed vehicle operable in a collision thereof, as claimed in claim 2 in which said first-named gas exhaust pipe is provided in a portion thereof with a flow resistance means for controlling the rate of flow of the exhaust gas through said pipe.

4. A rider's body protecting device for a high speed vehicle operable in a collision thereof, comprising a main inflatable bag operable to support the rider's body, gas producing means for feeding gases into said bag, and a gas exhaust pipe so sized in inner diameter as not to affect the inflation of said bag, said gas exhaust pipe being in communication at one end with the interior of said bag and terminating at the other end with an auxiliary inflatable bag which is substantially similar in structure to said main inflatable bag, said auxiliary bag being provided with another gas exhaust pipe for releasing the gases therefrom to allow the gases within said bag to release to the exterior of the vehicle.

5. A rider's body protecting device for a high speed vehicle operable in a collision thereof, as claimed in claim 4 in which said first-named gas exhaust pipe is provided in a portion thereof with a flow resistance means for controlling the rate of flow of the exhaust gas through said pipe.

* * * * *

UNITED STATES PATENT OFFICE
CERTIFICATE OF CORRECTION

Patent No. 3,778,083          Dated     December 11, 1973

Inventor(s) Masafumi Hamasaki

It is certified that error appears in the above-identified patent and that said Letters Patent are hereby corrected as shown below:

Column 2, line 1, change "noval" to --novel--.

Column 2, line 12, change "suitable" to --substantially--.

Column 4, line 29, change "shodk" to --shock--.

Column 6, line 20, after "bag" insert --3--.

Signed and sealed this 16th day of April 1974.

(SEAL)
Attest:

EDWARD M. FLETCHER, JR.          C. MARSHALL DANN
Attesting Officer                    Commissioner of Patents